US008625505B2

(12) United States Patent
Haartsen (10) Patent No.: US 8,625,505 B2
(45) Date of Patent: Jan. 7, 2014

(54) METHOD AND DEVICE FOR CONTROLLING TRANSMISSION RESOURCES FOR AUTOMATIC REPEAT REQUEST PROCESSES

(75) Inventor: Jacobus Haartsen, Hardenberg (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 671 days.

(21) Appl. No.: 12/669,485

(22) PCT Filed: Jul. 9, 2008

(86) PCT No.: PCT/EP2008/058914
§ 371 (c)(1),
(2), (4) Date: Jun. 27, 2010

(87) PCT Pub. No.: WO2009/010434
PCT Pub. Date: Jan. 22, 2009

(65) Prior Publication Data
US 2010/0290410 A1    Nov. 18, 2010

Related U.S. Application Data (60) Provisional application No. 60/951,285, filed on Jul. 23, 2007.

(30) Foreign Application Priority Data

Jul. 19, 2007 (EP) ..................... 07014132

(51) Int. Cl.
*H04W 4/00* (2009.01)
(52) U.S. Cl.
USPC .......................................... 370/329; 370/341
(58) Field of Classification Search
None
See application file for complete search history.

(56) References Cited

U.S. PATENT DOCUMENTS 6,490,645 B1 * 12/2002 Shahaf et al. ................. 710/244
7,181,666 B2    2/2007 Grob et al.
(Continued)

FOREIGN PATENT DOCUMENTS

EP    0 595 637 A1    5/1994
EP    0 633 671 A2    1/1995
(Continued)

OTHER PUBLICATIONS

Hou, C. et al. "Sharing of ARQ slots in Gilbert-Elliot channels" IEEE Transactions on Communications, vol. 52, No. 12, Dec. 2004, pp. 2070-2072.

(Continued)

*Primary Examiner* — Derrick Ferris
*Assistant Examiner* — Kodzovi Acolatse
(74) *Attorney, Agent, or Firm* — Potomac Patent Group PLLC (57) ABSTRACT

A method for controlling transmission resources for transmission and re-transmission of packets of a plurality of automatic repeat request processes comprises allocating, for each of the plurality of automatic repeat request processes, a transmission resource for transmission of a packet of the automatic repeat request process. The method further comprises allocating transmission resources as one or more re-transmission opportunities for re-transmission of the packet of at least two of the automatic repeat request processes such that at least two of the at least two automatic repeat request processes share transmission resource for at least one of the re-transmission opportunities. The method also comprises transmitting at least one control message indicating the allocated transmission resources. An electronic device for controlling transmission and retransmission of packets of a plurality of automatic repeat request processes is also described.

33 Claims, 4 Drawing Sheets

(56) References Cited

U.S. PATENT DOCUMENTS

| | | |
|---|---|---|
| 2004/0013102 A1 | 1/2004 | Fong et al. |
| 2004/0221218 A1 | 11/2004 | Grob et al. |
| 2005/0249118 A1 | 11/2005 | Terry et al. |
| 2008/0008206 A1* | 1/2008 | Cho et al. .................. 370/430 |
| 2008/0181173 A1* | 7/2008 | Wei ............................. 370/329 |
| 2009/0022098 A1* | 1/2009 | Novak et al. ................ 370/329 |

FOREIGN PATENT DOCUMENTS

| | | |
|---|---|---|
| EP | 0 825 738 A2 | 2/1998 |
| EP | 1 753 256 A1 | 2/2007 |
| RU | 2297104 C2 | 4/2007 |
| WO | 2004019544 A1 | 3/2004 |

OTHER PUBLICATIONS

PCT International Search Report, dated Jan. 19, 2009, in connection with International Application No. PCT/EP2008/058914.

PCT International Preliminary Report on Patentability, dated Jan. 28, 2010, in connection with International Application No. PCT/EP2008/058914.

Russian Decision on Grant, mailed Nov. 29, 2012, in connection with counterpart Russian Application No. 2010105861/07.

* cited by examiner

METHOD AND DEVICE FOR CONTROLLING TRANSMISSION RESOURCES FOR AUTOMATIC REPEAT REQUEST PROCESSES

CROSS-REFERENCE TO RELATED APPLICATIONS

This application claims priority under 35 U.S.C. §119 to European Patent Application No. 07014132.0, filed Jul. 19, 2007, which is hereby incorporated herein by reference in its entirety. This application also claims the benefit of U.S. Provisional Application No. 60/951,285, filed Jul. 27, 2007, which is hereby incorporated herein by reference in its entirety.

TECHNICAL FIELD

The present invention relates to the field of ARQ (Automatic Repeat reQuest), and in particular to controlling the allocation of transmission resources for ARQ re-transmissions.

BACKGROUND

Automatic Repeat reQuest (ARQ) denotes a family of protocols used to provide robustness to a communication link, such as a telecommunication link. One example ARQ scheme is denoted Hybrid Automatic Repeat reQuest (Hybrid ARQ or HARQ), and is a technique used, for example, in the UMTS (Universal Mobile Telecommunications System) standard for the HSPA (High Speed Packet Access) protocols, and is being proposed for use in the UMTS LTE (UMTS Long Term Evolution) standard that is under development within the 3GPP ($3^{rd}$ Generation Partnership Project) framework.

Generally in ARQ schemes, the receiver indicates to the sender if a packet has been received in error and, if so, the sender automatically re-transmits the packet. This process may be iterated until the packet is correctly received or until a maximum number of re-transmissions have been carried out.

In a HARQ scheme, the receiver combines the information in the erroneously received packet with the information in the re-transmitted packet and uses the combined information in the demodulation and decoding. This principle of operation is denoted soft combining and enhances the reception performance. The re-transmitted packet in a HARQ scheme may either comprise the same information as it did in the previous transmission, or it may comprise alternative information compared to the previous transmission.

When the re-transmitted packet comprises the same information as it did in the previous transmission, the scheme is denoted chase combining. In chase combining, the combination of information from the erroneously received packet and from the re-transmitted packet may be carried out using either the received symbols before demodulation or the demodulated bits before decoding.

When the re-transmitted packet comprises alternative information compared to the previous transmission, the scheme is denoted incremental redundancy. The packet to be re-transmitted may, for example, be exposed to a different puncturing pattern than in the previous transmission of the packet. This may result in that the re-transmitted packet comprises additional redundancy bits compared to the previous transmission. Alternatively, it may result in that some bits of the previous transmission have been excluded and additional bits have been comprised in the re-transmitted packet. In this way, new redundancy may be added to the information in the received packet for each re-transmission.

An incremental redundancy scheme may typically be based on a low-rate channel code, where only a limited number of the encoded bits are included in the first transmission (i.e., a large number of the encoded bits are punctured). This effectively results in that the first transmission is carried out using a high-rate channel code. If this first transmission of the packet results in an erroneous reception and the packet is to be re-transmitted in response to a re-transmission request, a different puncturing pattern may be used to puncture the packet before re-transmission (i.e., the encoded bits sent in the re-transmission differs from the ones sent in the previous transmission). Thus, successive combining of the information from the transmission and re-transmissions of a packet results in effective channel codes of gradually lower rates.

Hence, in the case of incremental redundancy, each re-transmission is, in general, different from the previous transmission. This leads to that the combination of information from the erroneously received packet and from the re-transmitted packet may not be carried out using the received symbols before demodulation, in contrast to the case of chase combining. Instead, it may be advisable to demodulate each received transmission or re-transmission of a packet separately and buffer the demodulated bits in the receiver. The soft combining may then be carried out implicitly as part of the decoding process. The decoding process may still use soft information to decode the demodulated bits.

In a communication system, transmission resources such as channelization codes in UMTS and physical resource blocks in UMTS LTE may be assigned to a user or a process by a scheduler. A user equipment (UE) may thus be assigned one or several transmission resources. Each base station (or possibly each base station controller) of a communication system commonly comprises a scheduler. Alternatively, each base station may comprise a plurality of schedulers.

Transmission resources are orthogonal to each other in most communication systems. In UMTS/HSPA, for example, the channelization codes are made up by Hadamard-Walsh codes, which are known to be mutually orthogonal. In the uplink of UMTS/HSPA, however, the codes are not orthogonal. Thus, the more codes are used in uplink transmission, the more interference is experienced.

In UMTS LTE, the physical resource blocks (PRB) are confined within a restricted time-frequency interval. Thus, each PRB is orthogonal in time and frequency to every other PRB used in a particular geographical area (cell).

There exist various strategies applicable to ARQ schemes for controlling transmissions of a packet and for determining when a packet in need for re-transmission should be scheduled. For synchronous traffic, which is characterized by a constant offering of data, a scheduler could reserve a large number of transmission resources for packet transmissions in advance. For example, a Voice over Internet Protocol (VoIP) packet may arrive every 20 ms on the average. Hence, it may be reasonable to schedule a transmission of a VoIP-packet for an ongoing VoIP-process in each time interval of 20 ms in advance. This strategy is also known as persistent scheduling or persistent reservation technique, and reduces the control overhead signaling on the link.

However, if a packet needs to be re-transmitted or not, and how many times it needs to be re-transmitted, depends on the error probability of the communication link (that is, the properties of the propagation path). This is a statistical process and may not be predictable. Hence, it is not possible to predict the need for re-transmissions in advance. In persistent scheduling, the re-transmission opportunities are also reserved in advance. Under most (except the worst) channel conditions a large number of these scheduled re-transmission opportunities are not used and the corresponding transmission resources remain empty, which may severely reduce the capacity of the communication link.

An alternative technique for controlling the assignment of re-transmission opportunities is denoted dynamic scheduling. In dynamic scheduling, the re-transmissions are handled by the scheduler in connection to each request for re-transmission. This technique is not as detrimental to the capacity of the communication link as the persistent scheduling technique, but instead it increases the control overhead and the latency. For example, for each re-transmission request in an uplink situation, a scheduling assignment signal may need to be supplied to the scheduler and a scheduling grant message that includes a resource allocation may need to be transmitted to the sender.

It is clear from the above that it is not obvious how to control the use of transmission resources for ARQ re-transmissions efficiently. Thus, there is a need for methods and devices for controlling transmission resources for ARQ processes to optimize the link capacity while introducing moderate or no overhead control signaling and latency.

In U.S. Pat. No. 7,181,666 B2 a method to reduce transmission latency is provided, in which a group of users in a system that employs a re-transmission mechanism such as Automatic Repeat reQuest (ARQ) is divided into multiple sub-groups of users. Transmission intervals are altered among the multiple sub-groups of users.

In US 2004/0013102 A1 a wireless communication system is disclosed, which includes a shared time division multiplexed (TDM) data channel. The TDM data channel can be used for automatic re-transmissions.

Hou C. et al., "Sharing of ARQ slots in Gilbert-Elliot channels", IEEE Transactions on Communications, vol. 52, no. 12, December 2004, pp. 2070-2072, treat the problem of m transmission slots sharing a pool of n automatic repeat request slots.

SUMMARY

It is an object of the invention to obviate at least some of the above disadvantages and to provide improved methods and devices for controlling transmission resources for transmission and re-transmission of ARQ processes.

According to a first aspect of the invention, this is achieved by a method for controlling transmission resources for transmission and re-transmission of packets of a plurality of automatic repeat request processes. The method comprises allocating, for each of the plurality of automatic repeat request processes, a transmission resource for transmission of a packet of the automatic repeat request process, and allocating transmission resources as one or more re-transmission opportunities for re-transmission of the packet of at least two of the automatic repeat request processes such that at least two of the at least two automatic repeat request processes share transmission resource for at least one of the re-transmission opportunities. The method also comprises transmitting at least one control message indicating the allocated transmission resources.

The packet may be punctured by a first puncturing pattern before transmission and by a second puncturing pattern before at least one re-transmission of the packet.

The step of allocating transmission resources for re-transmission may comprise allocating transmission resources for a pre-defined maximum number of re-transmission opportunities of the packet for each of the automatic repeat request processes.

The method may further comprise grouping the plurality of automatic repeat request processes into a number of groups, and allocating transmission resources as re-transmission opportunities such that the automatic repeat request processes of the same group share transmission resource, and automatic repeat request processes that do not belong to the same group do not share transmission resource.

The grouping step may further comprise letting at least one of the automatic repeat request processes that belongs to a first group for a first re-transmission opportunity of the packet belong to a second group for a second re-transmission opportunity of the packet.

The grouping step may further comprise letting the automatic repeat request processes of a group change between subsequent re-transmission opportunities.

The method may be performed when a first re-transmission opportunity precedes a second re-transmission opportunity. The grouping step may then further comprise letting an average number of groups associated with the first re-transmission opportunity of automatic repeat request processes in a group be smaller than the average number of groups associated with the second re-transmission opportunity of automatic repeat request processes in a group.

The grouping step may further comprise letting the number of groups associated with the first re-transmission opportunity be larger than the number of groups associated with the second re-transmission opportunity.

The method may be performed when a first group comprises a lower number of automatic repeat request processes than a second group, the first and second groups being associated with the same re-transmission opportunity, and when at least a first and second automatic repeat request process is associated with a priority, the priority of the first process being higher than the priority of the second process. The grouping step may then further comprise letting the first process belong to the first group, and letting the second process belong to the second group.

The packet may be a Voice over Internet Protocol packet. The transmission resources may be transmission time intervals, and the transmitting steps may be performed in accordance with at least one of the standards Universal Mobile Telecommunications System including High Speed Packet Access and Universal Mobile Telecommunications System Long Term Evolution. The transmission resources may be physical resource blocks of an orthogonal frequency division multiple access system, and the transmitting steps may be performed in accordance with the standard Universal Mobile Telecommunications System Long Term Evolution. The plurality of automatic repeat request processes comprises a plurality of hybrid automatic repeat request processes.

The method may further comprise receiving the at least one control message by a user equipment, transmitting a packet of a automatic repeat request process using a first transmission resource as indicated by the at least one control message, and receiving a positive or negative acknowledgement message associated with the transmitted packet. If a negative acknowledgement message is received the method may further comprise including a user equipment identification in the packet, and re-transmitting the packet using a second transmission resource as indicated by the at least one control message.

According to a second aspect of the invention, a computer program product comprises a computer readable medium, having thereon a computer program comprising program instructions, the computer program being loadable into a data-processing unit and adapted to cause the data-processing unit to execute the method according to the first aspect of the invention when the computer program is run by the data-processing unit.

According to a third aspect of the invention, a method for transmitting and re-transmitting packets of at least one automatic repeat request process comprises receiving at least one control message indicating transmission resources allocated for transmission and re-transmission opportunities for a packet of the at least one automatic repeat request process, transmitting the packet using a first transmission resource as indicated by the at least one control message, and receiving a positive or negative acknowledgement message associated with the transmitted packet. If a negative acknowledgement message is received the method further comprises including a user equipment identification in the packet, re-transmitting the packet using a second transmission resource as indicated by the at least one control message, and receiving a positive or negative acknowledgement message associated with the re-transmitted packet.

The method may further comprising repeating, until a positive acknowledgement message is received or a pre-defined maximum number of re-transmissions have occurred, the steps of re-transmitting the packet using a respective transmission resource as indicated by the at least one control message, wherein the time between subsequent respective transmission resources decreases over time, and receiving a positive or negative acknowledgement message associated with the re-transmitted packet.

According to a fourth aspect of the invention, an electronic device for controlling transmission and re-transmission of packets of a plurality of automatic repeat request processes comprises a scheduler adapted to allocate, for each of the plurality of automatic repeat request processes, a transmission resource for transmission of a packet of the automatic repeat request process, and to allocate transmission resources as one or more re-transmission opportunities for re-transmission of the packet of at least two of the automatic repeat request processes. The scheduler is further adapted to allocate the transmission resources for re-transmission such that at least two of the at least two automatic repeat request processes share transmission resource for at least one of the re-transmission opportunities. The electronic device further comprises a transmitter adapted to transmit at least one control message indicating the allocated transmission resources.

Furthermore, the electronic device according to the fourth aspect of the invention may have features corresponding to the various features of embodiments according to the first aspect of the invention.

The electronic device may be a base station or a base station controller.

According to a fifth aspect of the invention, a transceiver for transmitting and re-transmitting packets of at least one automatic repeat request process comprises a receiver adapted to receive at least one control message indicating transmission resources allocated for transmission and re-transmission opportunities for a packet of the at least one automatic repeat request process, and to receive a positive or negative acknowledgement message associated with the at least one packet. The transceiver further comprises a transmitter adapted to transmit the packet using a first transmission resource as indicated by the at least one control message. The transmitter is further adapted to, if a negative acknowledgement message is received, include a user equipment identification in the packet, and re-transmit the packet using a second transmission resource as indicated by the at least one control message.

Furthermore, the transceiver according to the fifth aspect of the invention may have features corresponding to the various features of embodiments according to the third aspect of the invention.

According to a sixth aspect of the invention, an electronic device comprises at least one transceiver according to the fifth aspect of the invention.

The electronic device may be a portable or handheld mobile radio communication equipment, a mobile radio terminal, a mobile telephone, a pager, a communicator, an electronic organizer, a smartphone, a computer, an embedded drive, or a mobile gaming device.

Further embodiments of the invention are defined in the dependent claims.

A first advantage of embodiments of the invention is that a greatly improved link capacity may be achieved. The increased effective capacity may be used, for example, for improving the latency and/or the data rate, for increasing the number of processes, and/or for improving the robustness. A second advantage of embodiments of the invention is that the control signaling overhead and latency may be much reduced compared to systems that use dynamic scheduling techniques and may not be increased compared to systems that use contention-free persistent scheduling techniques. These advantages may be achieved at marginal or no performance reduction.

BRIEF DESCRIPTION OF THE DRAWINGS

Further objects, features and advantages of the invention will appear from the following detailed description of embodiments of the invention, with reference being made to the accompanying drawings, in which.

DETAILED DESCRIPTION

As already touched upon, it is not obvious how to control the use of transmission resources for ARQ (Automatic Repeat reQuest) re-transmissions efficiently. In the following, embodiments of the invention will be described where transmission resources for ARQ processes are controlled to optimize the link capacity while introducing moderate or no overhead control signalling and latency.

Some of these embodiments are particularly useful for controlling the use of transmission resources for re-transmissions in the uplink. In the uplink, it may be particularly difficult to use dynamic scheduling for allocation of transmission resources due to the increased overhead and latency as explained above. It should be noted, however, that the presented embodiments of the invention may be equally applicable for controlling allocation of transmission resources in the downlink.

Embodiments of the invention will be described with focus on HARQ (Hybrid Automatic Repeat reQuest) schemes. It is emphasized, however, that embodiments of the invention are equally applicable to other ARQ schemes.

Strictly speaking, a user refers to a user equipment and an ARQ process refers to the process of transmissions and re-transmissions of a packet and to the combining of stored and re-transmitted versions of the packet. In general, each user may have more than one on-going ARQ process, and a transmission resource may be allocated to a user equipment or to an actual ARQ process. Throughout the description, the allocation of transmission resources to ARQ processes will be focused on. It should be noted, however, that embodiments of the invention are equally applicable for the allocation of transmission resources to users.

In the description and in the claims, the term transmission resource will be frequently used. This term is meant to denote any physical entity that may be used for transmission during a specified time interval. For example, the transmission resource may be a time slot or transmission time interval. The transmission resource may also be a specific frequency interval or time-frequency block, such as a physical resource block, or a channelization code.

Controlling the allocation of transmission resources for transmissions and re-transmissions of ARQ protocols has, until now, been based on contention-free access. Contention-free scheduling in ARQ protocols implies that no transmission resource is scheduled to be used by more than one process simultaneously, meaning that orthogonality is achieved and there is no possibility of collisions between transmitted packets.

However, if the load on a transmission resource allocated as a re-transmission opportunity becomes lower, e.g. due to favourable channel conditions, sharing the resource between more than one process would be more efficient. This technique of sharing transmission resources may be denoted contention-based scheduling.

For ARQ protocols in general, and for HARQ protocols in particular, the re-transmission load (the number of allocated transmission resources needed for successful reception of a packet) is reduced for every additional re-transmission. The reason is that the probability of correct packet reception increases for each re-transmission. For ARQ in general the probability increases because the number of transmission trials increases. For HARQ, the probability increases also because the information received in the re-transmitted packet can be combined with the information previously retrieved, and, for the incremental redundancy case, because more redundancy is included in each re-transmission. Hence, it may be advantageous to move from a contention-free scheduling for the initial transmission of a packet, via a contention-based scheduling for the initial re-transmissions where a few processes share the same transmission resource, to a contention-based scheduling for the later re-transmissions where a larger number of processes share the same transmission resource.

With contention-based access, if two or more processes access the allocated transmission resource at the same time to transmit a packet, a collision results, the deliveries fail, and the packets need to be re-transmitted. Therefore, it may be advantageous if the processes that share transmission resources differ between subsequent re-transmissions. In that way there is a better probability of successful delivery, since, if the processes that share transmission resources would be the same for subsequent re-transmissions, packets that collided during a previous re-transmission will collide again. This variation of which processes are sharing transmission resources may be applied between the different re-transmissions of the same packet, but also between different subsequent packets.

In the following example embodiments, the transmission resources will be exemplified by transmission time intervals (TTIs) that may hold e.g. physical resource blocks (PRB) according to the UMTS LTE standard. This is not meant to be limiting to the invention. Contrarily, the transmission resources may comprise any other time intervals such as time slots. The transmission resources may also comprise other physical entities, such as frequency intervals or channelization codes as mentioned before.

Figure 1:
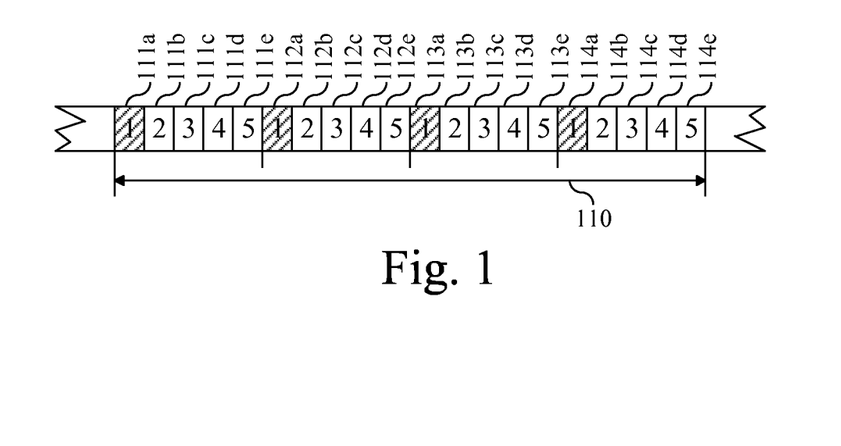
FIG. 1 is a diagram illustrating allocation of trans-missions and re-transmissions according to a contention-free persistent scheduling technique.

FIG. 1 shows an example of allocation of transmission and re-transmission opportunities according to a contention-free persistent scheduling technique. In this example, there are five processes that can each produce a packet in a time interval 110. To further exemplify, the five processes may be associated with VoIP users that each produce a packet every 20 ms. In UMTS LTE, 20 TTIs 111a-e, 112a-e, 113a-e, 114a-e, each of 1 ms, fit into a 20 ms VoIP-interval 110. Thus, each process may be scheduled for a first transmission and three re-transmissions of a packet within the interval 110. Process 1 may, for example, be scheduled for a first transmission in TTI 111a, and for re-transmissions in TTIs 112a, 113a and 114a as shown in FIG. 1. Correspondingly, process 2 may be scheduled for a first transmission in TTI 111b, and for re-transmissions in TTIs 112b, 113b and 114b, and so on.

In contention-free scheduling, the re-transmissions for each process are allocated separate transmission resources. In FIG. 1, the scheduler has reserved 15 TTIs for re-transmissions. As explained before, these TTIs may or may not be used, depending on the error conditions on the communication link. It is realized that the link capacity is efficiently used only at high error probabilities. When the error probability is zero, 75% of the capacity is wasted for the example in FIG. 1.

In FIG. 1, an example was provided where the data traffic was represented by synchronous traffic such as VoIP, where one data packet needs to be transmitted every 20 ms. It should be noted, however, that other traffic types and other time intervals between packets are equally relevant for embodiments of the invention. It should also be noted that other TTI lengths than 1 ms are possible. For example, a 10 ms TTI is defined in UMTS, a 2 ms TTI is defined for HSPA, and a 1 ms TTI is defined in UMTS LTE. The TTI lengths are usually fixed when a system is deployed. In some systems, the operator may choose different TTI settings.

Figure 2A:
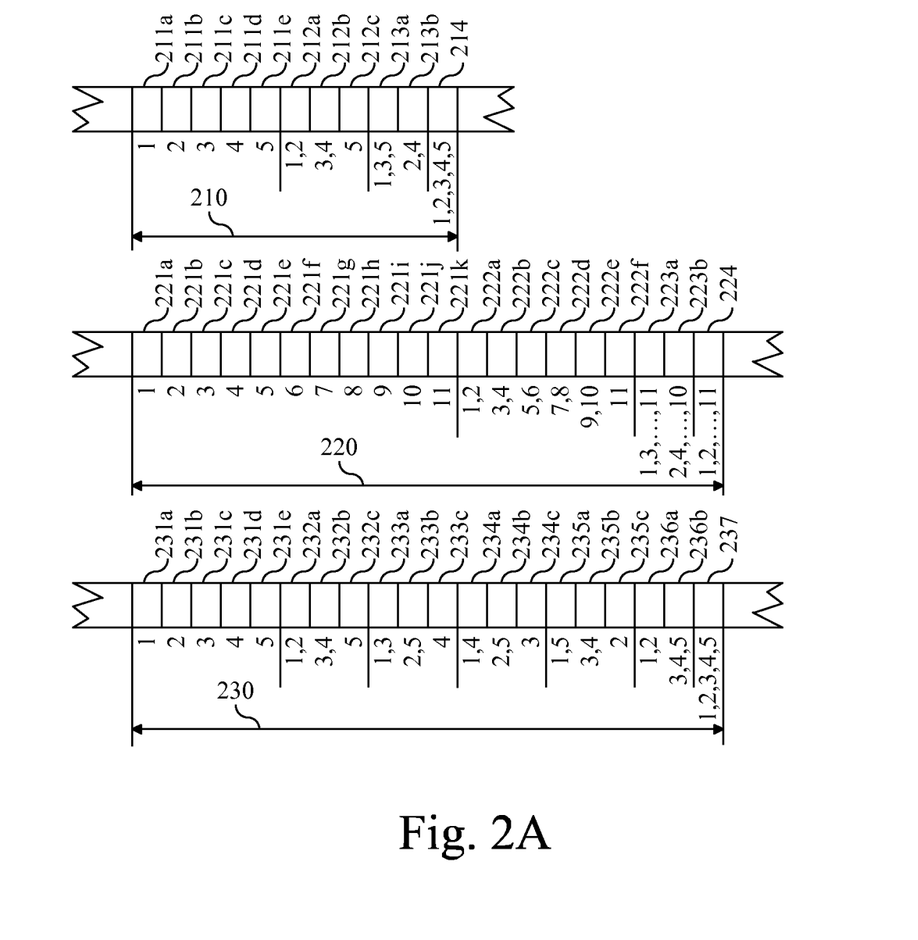
FIGS. 2A and 2B is a number of diagrams illustrating allocation of transmissions and re-transmissions according to some embodiments of the invention.
Figure 2B:
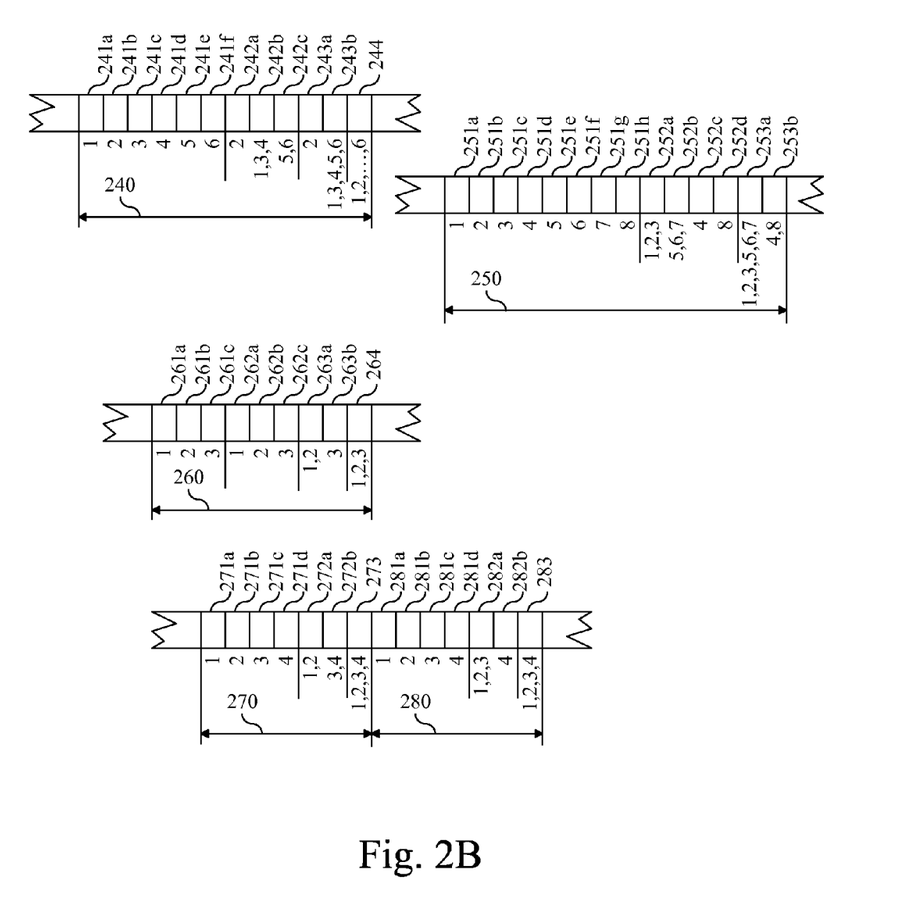

FIGS. 2A and 2B show various allocation examples in which a contention-free first transmission is combined with contention-based re-transmissions according to some embodiments of the invention. The time intervals 210, 220, 230, 240, 250, 260, 270, 280 comprise a various number of TTIs. As mentioned above, it should be noted that the average time between packet arrivals (corresponding to the time intervals 210, 220, . . . , 280) may be of any length, and that the transmission resources may comprise any time intervals or other transmission resources as mentioned before.

In the first example time interval 210 of FIG. 2A, the first five TTIs 211a-e are used for initial transmissions in the same manner as in FIG. 1. For the first re-transmission, however, the allocation is no longer orthogonal. Instead process 1 and process 2 share TTI 212a, and process 3 and process 4 share TTI 212b, while process 5 is alone to be allocated TTI 212c. Instead of five reserved TTIs for the first re-transmission as in FIG. 1, only three TTIs are reserved for the first re-transmissions. For the second re-transmission, the load should be lower than for the first re-transmission. Thus, process 1, process 3 and process 5 share TTI 213a, and process 2 and process 4 share TTI 213b. It is noteworthy that, in this example, the processes that shared the same TTI during the first re-transmission are not sharing the same TTI during the second re-transmission. In this way, each process may have different contenders for the shared resources during subsequent re-transmissions. Finally, in a third and last re-transmission, all the processes share the same TTI 214.

From this example it is clear that the capacity of a link using contention-based scheduling may be much increased compared to a contention-free scheme when practicing embodiments of the invention. With the example scheme used for scheduling interval 210 only 11 TTIs are required to support five processes with three re-transmissions, compared to the 20 TTIs required in the contention-free scheme illustrated in FIG. 1. This is a capacity improvement of almost 50%.

However, since several processes may share a single TTI in a contention-based scheme, the identity of a re-transmitted packet (i.e., which process it belongs to) is not uniquely defined by the TTI. Hence, there need to be a way to distinguish between re-transmitted packets of different processes. This may be achieved by including a UE identification (UE ID), or a shortened UE ID, in the packet at each re-transmission. Other techniques to distinguish between packets may be used, such as, for example, a UE specific scrambling code. Returning now to FIG. 2A and turning to the example scheduling interval 220, the capacity increase obtained when practicing embodiments of the invention will be demonstrated. In this example, the first eleven TTIs 221a-k are used for initial transmissions in the same manner as in FIG. 1. For the first re-transmission, processes 1 to 10 are grouped into pairs of two processes, which share the same TTI 222a-e while process 11 is alone to be allocated TTI 222f. For the second re-transmission, processes 1, 3, 5, 7, 9, and 11 share TTI 223a, and processes 2, 4, 6, 8, and 10 share TTI 223b. Again, the processes that shared the same TTI during the first re-transmission are not sharing the same TTI during the second re-transmission. In the third and last re-transmission, all the processes share the same TTI 224. Hence, comparing with FIG. 1, it is clear that more processes may be handled with the same transmission resources and the same number of re-transmission opportunities when practicing embodiments of the invention. In this particular example, eleven processes were handled in 20 TTIs compared to five processes as described in FIG. 1.

The allocation of TTIs in the example scheduling interval 230 demonstrates how the capacity increase obtained when practicing embodiments of the invention may be utilized for more re-transmissions instead of more processes. In this example, the first five TTIs 231a-e are used for initial transmissions in the same manner as in FIG. 1. For the first, second, third and fourth re-transmissions, four of the processes 1 to 5 are grouped into pairs of two processes which share the same TTI 232a-b, 233a-b, 234a-b, 235a-b, while one process is allocated its own TTI 232c, 233c, 234c, 235c. For the fifth re-transmission, processes 1 and 2 share TTI 236a, and processes 3, 4, and 5 share TTI 236b. In the sixth and last re-transmission, all the processes share the same TTI 237. Again, the processes that share the same TTI change between different re-transmissions. Comparing again with FIG. 1, it is clear that more re-transmissions may be handled with the same transmission resources and the same number of processes when practicing embodiments of the invention. In this particular example, six re-transmissions were handled in 20 TTIs compared to three re-transmissions as described in FIG. 1.

In other embodiments, the capacity increase may be utilized to allow a combination of more processes and more re-transmissions.

Studying now FIG. 2B and the allocation of TTIs in the example scheduling interval 240, the use of priority information according to some embodiments of the invention will be elaborated on.

In this example, the first six TTIs 241a-f are used for initial transmissions. For the first re-transmission, process 2 is allocated TTI 242a, processes 1, 3, and 4 are allocated TTI 242b, and processes 5 and 6 are allocated TTI 242c. For the second re-transmission, process 2 is allocated TTI 243a, and processes 1, 3, 4, 5, and 6 are allocated TTI 243b. In the fourth and last re-transmission, all the processes share the same TTI 244.

The processes in a scheduling scheme may be assigned different priorities according to some embodiments of the invention. A process that has been assigned a high priority may be allocated a TTI with less or no contenders. In the above example, process 2 has no contenders in the first and second re-transmissions allocated in TTIs 242a and 243a. Therefore, process 2 has a better success rate than the other processes.

The use of priority information according to some embodiments of the invention is further exemplified through the allocation of TTIs in the example scheduling interval 250.

In this example, processes 4 and 8 are assumed to have been assigned a high priority. The first eight TTIs 251a-f are used for initial transmissions. For the first re-transmission, processes 1, 2, 3, 5, 6, and 7 are organized into two groups of three processes each, and the processes in each group share a TTI 252a-b. Processes 4 and 8 on the other hand are each allocated their own TTI 252c-d. For the second and last re-transmission, processes 1, 2, 3, 5, 6, and 7 are allocated TTI 253a, and processes 4 and 8 are allocated TTI 253b. Hence, in this example processes 4 and 8 have better success rates than the other processes.

It should also be noted from the previous examples that all the processes may be scheduled in the same TTI for the last re-transmission but that this is not compulsory, which is seen, for example, in the allocation of transmission resources in interval 250.

The allocation of TTIs in the example scheduling interval 260 illustrates that, according to some embodiments of the invention, it is not necessary to apply a contention-based scheduling for all of the re-transmission opportunities.

In the example, the first three TTIs 261a-c are used for initial transmissions. For the first re-transmission, processes 1, 2, and 3 are each allocated their own TTI 262a-c. Thus, a contention-free scheduling scheme is used for the first re-transmission. For the second re-transmission, processes 1 and 2 are allocated TTI 263a, and process 3 is allocated TTI 263b. In the fourth and last re-transmission, all the processes share the same TTI 264.

According to example embodiments of the invention, the allocation schemes may also differ between subsequent scheduling intervals. This is demonstrated in the example subsequent scheduling intervals 270 and 280.

In scheduling interval 270, the first four TTIs 271a-d are used for initial transmissions. For the first re-transmission, processes 1 and 2 are allocated TTI 272*a* and processes 3 and 4 are allocated TTI 272*b*. In the third and last re-transmission, all the processes share the same TTI 273.

In the subsequent scheduling interval 280, the first four TTIs 281*a-d* are used for initial transmissions in the same way as for scheduling interval 270. For the first re-transmission, however, processes 1, 2, and 3 are allocated TTI 282*a* and process 4 is allocated TTI 282*b*. This may, for example, be because process 4 was assigned a higher priority before delivering the packet associated with scheduling interval 280. In the third and last re-transmission, all the processes share the same TTI 283.

It should be noted that, according to example embodiments of the invention, the allocation schemes may differ between subsequent scheduling intervals in other ways, such as, the number of supported processes, the number of re-transmission opportunities for each process, the number of members in a group for a re-transmission, and the identity of the group members for a re-transmission. The example above was illustrating that one reason for changing the scheduling scheme between subsequent re-transmissions may be that one or more processes are assigned new priorities. Other reasons for changing scheduling schemes between subsequent packet arrivals may, for example, be a change in the individual channel conditions of the users associated with the respective process. Processes associated with users having good channel conditions may not need to be allocated many re-transmission opportunities, while processes associated with users having poor channel conditions may need to be allocated more re-transmission opportunities. Information regarding the channel conditions of different users may be derived, for example, from received signal power, packet error rate, or dispersion (using e.g. RAKE finger information or equalizer information).

It should be noted from the examples illustrated in FIGS. 2A and 2B that the number of TTIs in a scheduling interval may vary. This may be due to that there may be TTIs of various lengths or due to that the packets may arrive in cycles of different lengths, or both. It should also be noted from the examples in FIGS. 2A and 2B that the number of re-transmissions and the number of processes supported may vary. A further variation (not shown in the Figures) is that, in some embodiments, the different processes may each be allocated a different number of re-transmission opportunities.

Figure 3:
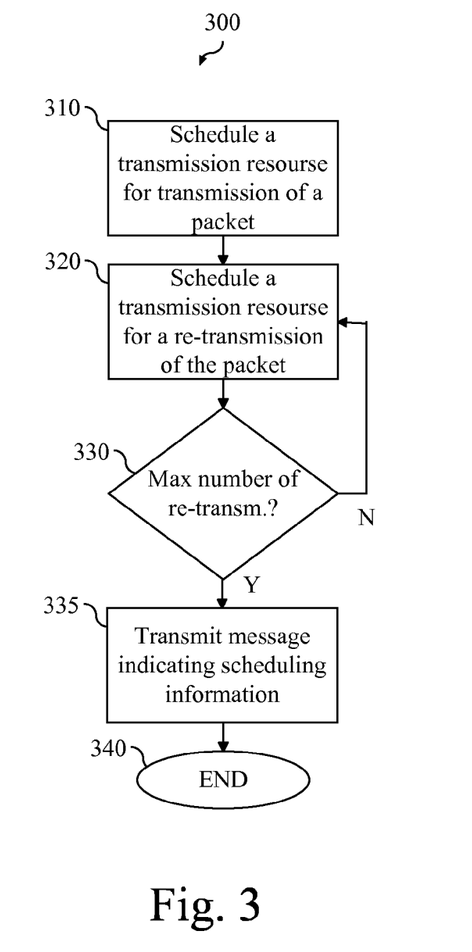
FIG. 3 is a flow chart illustrating a method for controlling the allocation of transmission resources for transmissions and re-transmissions according to some embodiments of the invention.

In FIG. 3 a flow chart is shown illustrating a method 300 for controlling the allocation of transmission resources for transmissions and re-transmissions of a packet according to some embodiments of the invention. The method begins in step 310, where the first transmission of the packet is allocated a transmission resource, such as a PRB, TTI, or channelization code. Then, in step 320, a transmission resource is allocated as a re-transmission opportunity for the packet. The transmission resource allocated for the re-transmission opportunity may also be allocated as a re-transmission opportunity for one or more other packets according to a contention-based scheduling technique.

Step 320 is iterated until a maximal number of re-transmission opportunities have been scheduled for the packet, which is tried in step 330. Hence, if the maximal number of re-transmission opportunities have not been scheduled (NO path out of step 330) the process returns to step 320. If, on the other hand, the maximal number of re-transmission opportunities have been scheduled (YES path out of step 330) the process continues to step 335, where a message is transmitted that indicates the transmission resources that have been allocated for transmission and re-transmission of the packet. This message may comprise information regarding one or many processes and/or users. It may also be divided into several messages each comprising, for example, information regarding allocation for a single transmission or re-transmission. It should be noted that these messages might alternatively be transmitted after each allocation, that is, directly after steps 310 and 320 respectively. A further alternative is that the information may be collected for a number of subsequent scheduling intervals and transmitted less frequently. Finally, the process ends in step 340.

Figure 4:
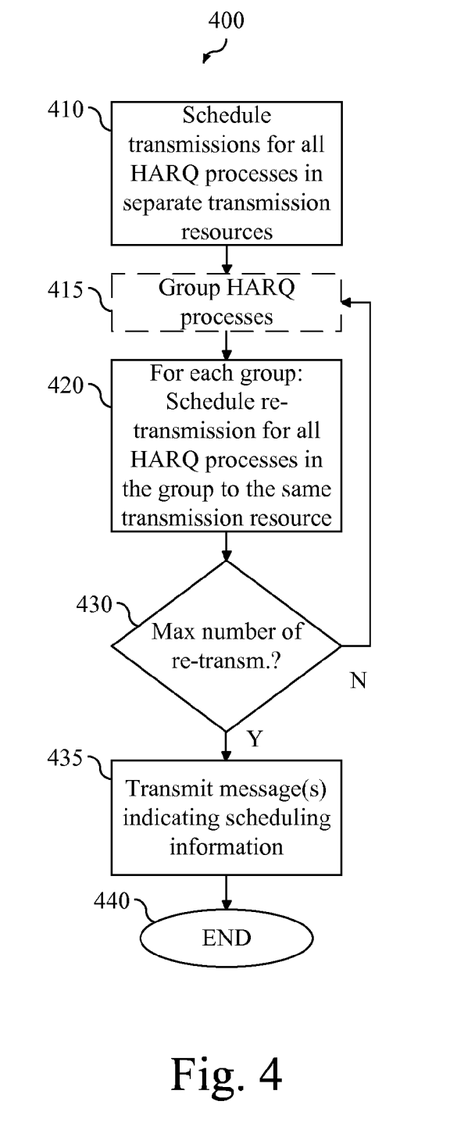
FIG. 4 is a flow chart illustrating a method for controlling the allocation of transmission resources for transmissions and re-transmissions according to some embodiments of the invention.

FIG. 4 is a flow chart illustrating a method 400 for controlling the allocation of transmission resources for transmissions and re-transmissions of packets of a plurality of HARQ processes according to some embodiments of the invention. The method begins in step 410, where the first transmissions of the packets are each allocated a transmission resource such as a PRB, TTI, or channelization code. Then, in step 415, groups of HARQ processes are formed, where at least one of the groups comprises at least two processes.

In step 420, each of the processes is allocated a transmission resource for a re-transmission opportunity. The processes belonging to the same group are allocated the same transmission resource.

Steps 415 and 420 are iterated until a maximal number of re-transmission opportunities have been scheduled for the processes This is tried in step 430. Hence, if the maximal number of re-transmission opportunities have not been scheduled (NO path out of step 430) the process returns to step 415. If, on the other hand, the maximal number of re-transmission opportunities have been scheduled (YES path out of step 430) the process continues to step 435, where a message is transmitted that indicates the transmission resources that have been allocated for trans-mission and re-transmission opportunities for the processes. This message may or may not be divided into several messages each comprising, for example, information regarding a single process and/or a single transmission or re-transmission. It should be noted that these messages might alternatively be transmitted after each allocation, that is, directly after steps 410 and 420. Finally, the process ends in step 440.

For the first re-transmission, step 415 may alternatively be performed before or in parallel with step 410. For each re-transmission, step 415 may be performed less frequently than in each execution of the method 400. For example, step 415 may be performed every $10^{th}$ or every $100^{th}$ execution of the method 400. In such cases, the groupings for each re-transmission are remembered and used until new groupings are defined. In fact, step 415 may be entirely excluded from the method 400. In that case, the groupings for the different re-transmissions may be pre-determined. Furthermore, in some embodiments, the process may return to step 420 instead of step 415 if the maximal number of re-transmission opportunities has not been scheduled. In these cases, step 415 may comprise forming the different groups for all of the maximal number of re-transmissions all at once.

According to some embodiments of the invention, the message that indicates the transmission resources that have been allocated is received by one or more user equipments. If the message comprises information regarding the allocation for several users, each of the users singles out the information applicable to that user. Then each user equipment may transmit packets in accordance with the received allocation information. The packets are received by, for example, a base station, and the base station responds according to the HARQ procedure by sending positive or negative acknowledgement messages (ACK/NACK), which the respective user equipment receives. If a user equipment receives a negative acknowledgement message, it re-transmits the packet associated with the negative acknowledgement message in accordance with the received allocation information, until a positive acknowledgement message is received or a maximal number of re-transmissions have been sent. The user equipment may include distinguishing information, such as a user equipment identification, with each re-transmission of a packet.

Figure 5:
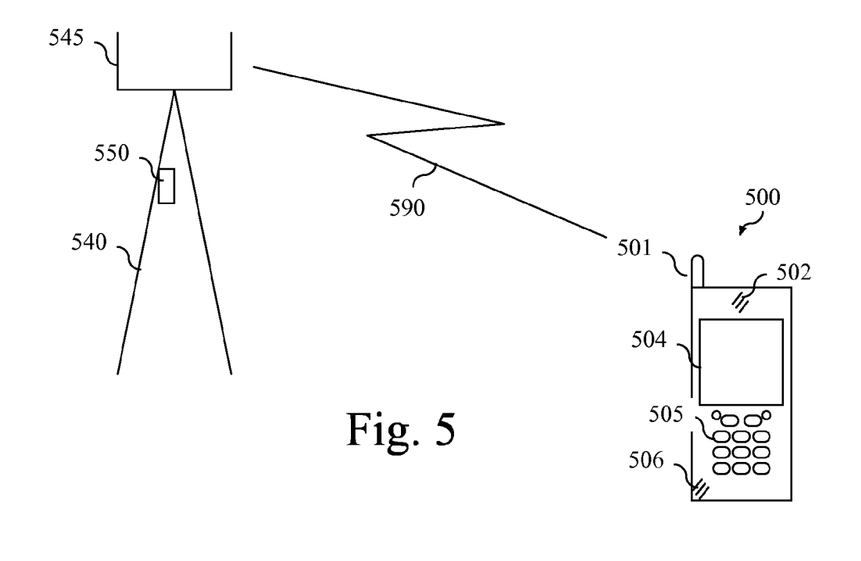
FIG. 5 is a schematic front view of a mobile terminal connected, though a radio link, to a base station site, which may comprise an electronic device according to some embodiments of the invention.

FIG. 5 illustrates a mobile terminal 500 connected, though a radio link 590, to a base station site 540. The base station site 540 comprises one or more antennas 545 and at least one base station 550. The base station may be adapted to control allocation of transmission resources for transmissions and re-transmissions of HARQ processes according to embodiments of the invention.

The mobile telephone 500 is illustrated in a schematic front view. This example mobile telephone 500 comprises an antenna 501 mounted on the housing of the apparatus. Alternatively, the mobile telephone 500 may have an internal antenna mounted within the housing of the apparatus. The mobile terminal 500 may even comprise multiple antennas. The mobile telephone 500 may further comprise a display 504, a keypad 505, a loudspeaker 502, and a microphone 506, which together provides a man-machine interface for operating the mobile telephone 500.

The mobile telephone 500 is adapted to connect to a mobile telecommunication network via the wireless link 590 to a radio base station 550. Hence, a user of the mobile telephone 500 may use conventional circuit-switched telecommunication services such as voice calls, data calls, video calls, and fax transmissions, as well as packet-based services such as electronic messaging, VoIP, Internet browsing, electronic commerce, etc. To this end, the mobile telephone is compliant with at least one mobile telecommunication standard, for instance GSM (Global System for Mobile communications), GPRS (General Packet Radio Service), EDGE (Enhanced Data rates for GSM Evolution), UMTS (Universal Mobile Telecommunications System), or UMTS LTE (UMTS Long Term Evolution).

Figure 6:
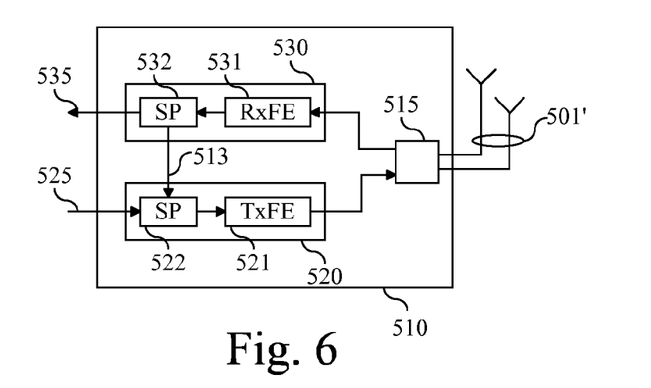
FIG. 6 is a block diagram illustrating a transceiver that comprises a transmitter according to some embodiments of the invention.

FIG. 6 is a block diagram of a transceiver 510 that may be comprised in a mobile telephone 500 according to some embodiments of the invention. The example transceiver 510 comprises a receiver 530, a transmitter 520 and separating circuitry 515. The separating circuitry 515, which may include an antenna switch and/or various filters, is adapted to guide signals from the transmitter 520 to the one or more antennas 501', and to guide signals from the one or more antennas 501' to the receiver 530.

The receiver 530 comprises a receiver front end (RxFE) 531 and signal processing circuitry (SP) 532. The receiver front end 531 may comprise filters, down-conversion circuitry and an analog-to-digital converter, and the signal processing circuitry 532 may comprise a demodulator, a decoder, and a de-multiplexer. The receiver 530 is adapted to receive, process and single out information regarding allocation, e.g. information that indicates which transmission resources have been allocated to that particular user for a particular transmission or re-transmission. This information is then supplied to the transmitter 520 as shown at 513. Other signals processed by the receiver may be supplied to further processing and/or higher layers of a system stack as indicated at 535.

The transmitter 520 comprises a transmitter front end (TxFE) 521 and signal processing circuitry (SP) 522. The transmitter front end 521 may comprise a digital-to-analog converter, filters, and up-conversion circuitry, and the signal processing circuitry 522 may comprise a multiplexer, an encoder, and a modulator. The transmitter 520 is adapted to transmit and re-transmit packets, which may be supplied by higher layers as indicated at 525, according to the scheduling information supplied by the receiver 530. The transmitter 520 is also adapted to include distinguishing information, such as a user equipment identification, with each re-transmission of a packet.

The receiver 530 is also adapted to receive a positive (ACK) or negative (NACK) acknowledgement message in response to transmitting a packet. These acknowledgement messages are part of the HARQ protocol. The acknowledgement message may be supplied by the receiver to the transmitter either directly, e.g. together with scheduling information at 513 or at a separate connection (not shown), or indirectly through a re-transmission command or similar. If a negative acknowledgement message was received, the transmitter 520 is adapted to re-transmit the packet according to the scheduling information supplied by the receiver 530. The transmitter 520 may be further adapted to re-transmit the packet according to the scheduling information supplied by the receiver 530 if no acknowledgement message at all was received by the receiver 530 in response to transmitting a packet.

Figure 7:
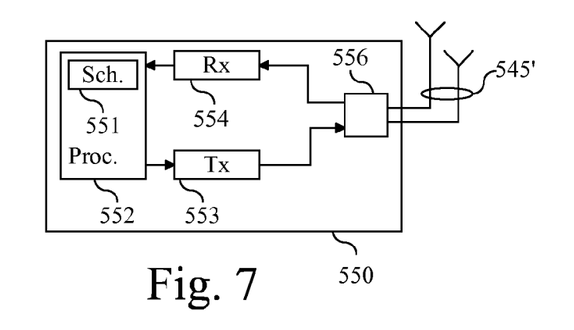
FIG. 7 is a block diagram illustrating parts of a base station according to some embodiments of the invention.

FIG. 7 is a block diagram of functional units that may be comprised in a base station 550 according to some embodiments of the invention. The example base station 550 is adapted to perform at least one method of controlling transmission resources according to embodiments of the invention, such as, for example, any or both of the methods described in FIGS. 3 and 4. The example base station 550 comprises a scheduler (Sch.) 551, included in a processing unit (Proc.) 552. The scheduler may alternatively be comprised in another entity, such as a radio network controller. The processing unit 552 may comprise any processing circuitry, such as application-specific integrated circuits (ASIC), central processing units (CPU) etc. The processing circuitry may be adapted to run, for example, data or signaling processing algorithms.

The base station 550 further comprises transmitter circuitry (Tx) 553, receiver circuitry (Rx) 554, and separating circuitry 556. The separating circuitry 556, which may include an antenna switch and/or various filters, is adapted to guide the signals from the transmitter circuitry 553 to the one or more antennas 545', and to guide signals from the one or more antennas 545' to the receiver circuitry 554. The transmitter circuitry 553 may comprise, for example, processing circuitry such as multiplexers, encoders, modulators, and a transmitter front end. The transmitter circuitry is adapted to transmit control messages including scheduling information. The scheduling information may be information that indicates which transmission resources have been allocated to that particular user for a particular transmission or re-transmission.

One of the advantages of embodiments of the invention is a greatly improved link capacity compared to systems that use contention-free persistent scheduling techniques. The increased effective capacity may be used, for example, for improving the latency and/or the data rate (as more packets can be sent per time unit, cf. scheduling interval 210 in FIG. 2A where latency is reduced by shortening the scheduling interval). The increased capacity may also be used for increasing the number of processes (cf. scheduling interval 220 in FIG. 2A), and/or for improving the robustness (cf. scheduling interval 230 in FIG. 2A). Another advantage of embodiments of the invention is that the control signaling overhead and latency is much reduced compared to systems that use dynamic scheduling techniques and is not increased compared to systems that use contention-free persistent scheduling techniques. These advantages are achieved at marginal or no performance reduction depending on, for example, channel conditions.

Throughout the description, example embodiments of the invention have focused on UMTS LTE. It should be noted, however, that this was done to simplify the description and is by no means limiting to the invention. Contrarily, embodiments of the invention are equally applicable to other telecommunication standards in addition to UMTS LTE such as, for example, UMTS and WiMAX.

The described embodiments of the invention and their equivalents may be performed by general-purpose circuits associated with or integral to the scheduler 551, the transmitter 553, and/or the transceiver 510, such as digital signal processors (DSP), central processing units (CPU), co-processor units, or by specialized circuits such as, for example, application-specific integrated circuits (ASIC). All such forms are contemplated to be within the scope of the invention.

The invention may be embodied within an electronic apparatus comprising an electronic device or transceiver according to any of the embodiments of the invention. The electronic apparatus may, for example, be a portable or handheld mobile radio communication equipment, a mobile radio terminal, a mobile telephone, a pager, a communicator, an electronic organizer, a smartphone, a computer, an embedded drive, a mobile gaming device, or a (wrist) watch. The electronic apparatus may alternatively be a base station or a base station controller in a telecommunication system.

The invention has been described herein with reference to various embodiments. However, a person skilled in the art would recognize numerous variations to the described embodiments that would still fall within the scope of the invention. For example, the method embodiments described herein describes the method through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that, in the description of embodiments of the invention, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

It should be emphasized that the term "comprises/comprising" when used in this specification is taken to specify the presence of stated features, integers, steps, or components, but does not preclude the presence or addition of one or more other features, integers, steps, components, or groups thereof.

Hence, it should be understood that the limitations of the described embodiments are merely for illustrative purpose and by no means limiting. Instead, the invention is construed to be limited by the appended claims and all reasonable equivalents thereof.

The invention claimed is:

1. A method for controlling transmission resources for transmission and re-transmission of packets of a plurality of automatic repeat request processes comprising:

allocating, for each of the plurality of automatic repeat request processes, a transmission resource for transmission of a packet of the automatic repeat request process;

using a contention-based scheduling strategy to allocate transmission resources as one or more re-transmission opportunities for re-transmission of the packet of at least two of the automatic repeat request processes such that at least two of the at least two automatic repeat request processes share a transmission resource for at least one of the re-transmission opportunities, wherein a collision arises if two or more of the at least two automatic repeat request processes that share the transmission resource for at least one of the retransmission opportunities use the shared transmission resource for transmission at the same time;

transmitting at least one control message indicating the allocated transmission resources;

grouping the plurality of automatic repeat request processes into a number of groups; and allocating transmission resources as re-transmission opportunities such that the automatic repeat request processes of the same group share transmission resource, and automatic repeat request processes that do not belong to the same group do not share transmission resource, wherein a first re-transmission opportunity precedes a second re-transmission opportunity, and the grouping step further comprises letting the number of groups associated with the first re-transmission opportunity be larger than the number of groups associated with the second re-transmission opportunity.

2. The method according to claim 1, performed when the packet is to be punctured by a first puncturing pattern before transmission of the packet and the packet is to be punctured by a second puncturing pattern before at least one re-transmission of the packet.

3. The method according to claim 1, wherein the step of allocating transmission resources for re-transmission comprises allocating transmission resources for a pre-defined maximum number of re-transmission opportunities of the packet for each of the automatic repeat request processes.

4. The method according to claim 1, wherein the grouping step further comprises letting at least one of the automatic repeat request processes that belongs to a first group for a first re-transmission opportunity of the packet belong to a second group for a second re-transmission opportunity of the packet.

5. The method according to claim 1, wherein the grouping step further comprises letting the automatic repeat request processes of a group change between subsequent re-transmission opportunities.

6. The method according to claim 1, wherein the grouping step further comprises letting an average number of groups, associated with the first re-transmission opportunity of automatic repeat request processes in a group, be smaller than the average number of groups associated with the second re-transmission opportunity of automatic repeat request processes in a group.

7. The method according to claim 1, wherein a first group comprises a lower number of automatic repeat request processes than a second group, the first and second groups being associated with the same re-transmission opportunity, wherein at least a first and second automatic repeat request process is associated with a priority, the priority of the first process being higher than the priority of the second process, and wherein the grouping step further comprises:

letting the first process belong to the first group; and letting the second process belong to the second group.

8. The method according to claim 1, wherein the packet is a Voice over Internet Protocol packet.

9. The method according to claim 1, wherein the transmission resources are transmission time intervals, and wherein the transmitting steps are performed in accordance with at least one of the standards Universal Mobile Telecommunications System including High Speed Packet Access and Universal Mobile Telecommunications System Long Term Evolution.

10. The method according to claim 1, wherein the transmission resources are physical resource blocks of an orthogonal frequency division multiple access system, and wherein the transmitting steps are performed in accordance with the standard Universal Mobile Telecommunications System Long Term Evolution.

11. The method according to claim 1, wherein the plurality of automatic repeat request processes comprise a plurality of hybrid automatic repeat request processes.

12. The method according to claim 1, further comprising:
receiving the at least one control message by a user equipment;
transmitting a packet of an automatic repeat request process using a first transmission resource as indicated by the at least one control message;
receiving a positive or negative acknowledgement message associated with the transmitted packet; and
if a negative acknowledgement message is received:
including a user equipment identification in the packet; and
re-transmitting the packet using a second transmission resource as indicated by the at least one control message.

13. A non-transitory computer program product comprising a computer readable medium, having thereon a computer program comprising program instructions, the computer program being load-able into a data-processing unit and adapted to cause the data-processing unit to execute a method for controlling transmission resources for transmission and re-transmission of packets of a plurality of automatic repeat request processes when the computer program is run by the data-processing unit, the method comprising:
allocating, for each of the plurality of automatic repeat request processes, a transmission resource for transmission of a packet of the automatic repeat request process;
using a contention-based scheduling strategy to allocate transmission resources as one or more re-transmission opportunities for re-transmission of the packet of at least two of the automatic repeat request processes such that at least two of the at least two automatic repeat request processes share a transmission resource for at least one of the re-transmission opportunities, wherein a collision arises if two or more of the at least two automatic repeat request processes that share the transmission resource for at least one of the retransmission opportunities use the shared transmission resource for transmission at the same time;
transmitting at least one control message indicating the allocated transmission resources;
grouping the plurality of automatic repeat request processes into a number of groups; and
allocating transmission resources as re-transmission opportunities such that the automatic repeat request processes of the same group share transmission resource, and automatic repeat request processes that do not belong to the same group do not share transmission resource,
wherein a first re-transmission opportunity precedes a second re-transmission opportunity, and
the grouping step further comprises letting the number of groups associated with the first re-transmission opportunity be larger than the number of groups associated with the second re-transmission opportunity.

14. A method for transmitting and re-transmitting packets of at least two automatic repeat request processes comprising:
receiving at least one control message indicating transmission resources allocated for transmission and retransmission opportunities for a packet of the at least two automatic repeat request processes;
transmitting the packet using a first transmission resource as indicated by the at least one control message;
receiving a positive or negative acknowledgement message associated with the transmitted packet; and
if a negative acknowledgement message is received:
including a user equipment identification in the packet;
re-transmitting the packet using a second transmission resource as indicated by the at least one control message;
receiving a positive or negative acknowledgement message associated with the re-transmitted packet; and
repeating, until a positive acknowledgement message is received or a pre-defined maximum number of re-transmissions have occurred, the steps of:
re-transmitting the packet using a respective transmission resource as indicated by the at least one control message, wherein the time between subsequent respective transmission resources used for re-transmitting the packet decreases over time; and
receiving a positive or negative acknowledgement message associated with the re-transmitted packet,
wherein:
the at least two automatic repeat request processes are grouped into a number of groups; and
transmission resources are allocated as re-transmission opportunities such that the automatic repeat request processes of the same group share transmission resource, and automatic repeat request processes that do not belong to the same group do not share transmission resource,
wherein a first re-transmission opportunity precedes a second re-transmission opportunity, and
the grouping of the at least two automatic repeat request processes lets the number of groups associated with the first re-transmission opportunity be larger than the number of groups associated with the second re-transmission opportunity.

15. The method according to claim 14, wherein the packet is a Voice over Internet Protocol packet.

16. The method according to claim 14, wherein the at least two automatic repeat request processes comprise at least one hybrid automatic repeat request process.

17. An electronic device for controlling transmission and re-transmission of packets of a plurality of automatic repeat request processes comprising:
a scheduler adapted to:
allocate, for each of the plurality of automatic repeat request processes, a transmission resource for transmission of a packet of the automatic repeat request process; and
use a contention-based scheduling strategy to allocate transmission resources as one or more re-transmission opportunities for re-transmission of the packet of at least two of the automatic repeat request processes such that at least two of the at least two automatic repeat request processes share a transmission resource for at least one of the re-transmission opportunities, wherein a collision arises if two or more of the at least two automatic repeat request processes that share the transmission resource for at least one of the retransmission opportunities use the shared transmission resource for transmission at the same time; and a transmitter adapted to transmit at least one control message indicating the allocated transmission resources, wherein the scheduler is further adapted to:

group the plurality of automatic repeat request processes into a number of groups; and allocate transmission resources as re-transmission opportunities such that the automatic repeat request processes of the same group share transmission resource, and automatic repeat request processes that do not belong to the same group do not share transmission resource, wherein the scheduler is further adapted to let the number of groups associated with the first re-transmission opportunity be larger than the number of groups associated with the second re-transmission opportunity.

18. The electronic device according to claim 17, wherein the scheduler is further adapted to allocate transmission resources for a pre-defined maximum number of re-transmission opportunities of the packet for each of the automatic repeat request processes.

19. The electronic device according to claim 17, wherein the scheduler is further adapted to let at least one of the automatic repeat request processes that belongs to a first group for a first re-transmission opportunity of the packet belong to a second group for a second re-transmission opportunity of the packet.

20. The electronic device according to claim 17, wherein the scheduler is further adapted to let the automatic repeat request processes of a group change between subsequent re-transmission opportunities.

21. The electronic device according to claim 17, wherein the scheduler is further adapted to let an average number of groups, associated with the first re-transmission opportunity of automatic repeat request processes in a group, be smaller than the average number of groups associated with the second re-transmission opportunity of automatic repeat request processes in a group.

22. The electronic device according to claim 17, wherein a first group comprises a lower number of automatic repeat request processes than a second group, the first and second groups being associated with the same re-transmission opportunity, wherein at least a first and second automatic repeat request process is associated with a priority, the priority of the first process being higher than the priority of the second process, and wherein the scheduler is further adapted to:

let the first process belong to the first group; and
let the second process belong to the second group.

23. The electronic device according to claim 17, wherein the packet is a Voice over Internet Protocol packet.

24. The electronic device according to claim 17, wherein the transmission resources are transmission time intervals, and wherein the electronic device complies with at least one of the standards Universal Mobile Telecommunications System including High Speed Packet Access and Universal Mobile Telecommunications System Long Term Evolution.

25. The electronic device according to claim 17, wherein the transmission resources are physical resource blocks of an orthogonal frequency division multiple access system, and wherein the transmitting steps are performed in accordance with the standard Universal Mobile Telecommunications System Long Term Evolution.

26. The electronic device according to claim 17, wherein the plurality of automatic repeat request processes comprise a plurality of hybrid automatic repeat request processes.

27. The electronic device according to claim 17, wherein the electronic device is a base station, or a base station controller.

28. A transceiver for transmitting and re-transmitting packets of at least two automatic repeat request processes comprising:

a receiver adapted to:
receive at least one control message indicating transmission resources allocated for transmission and re-transmission opportunities for a packet of the at least two automatic repeat request processes; and
receive a positive or negative acknowledgement message associated with the at least one packet; and a transmitter adapted to:
transmit the packet using a first transmission resource as indicated by the at least one control message; and
if a negative acknowledgement message is received:
re-transmit the packet using a second transmission resource as indicated by the at least one control message, wherein the transmitter is further adapted to include a user equipment identification in the packet before re-transmission, wherein the transmitter is further adapted to repeat the re-transmission of the packet using a respective transmission resource as indicated by the at least one control message, until a positive acknowledgement message is received or a pre-defined maximum number of re-transmissions have occurred, wherein the time between subsequent respective transmission resources used for re-transmitting the packet decreases over time, wherein:
the at least two automatic repeat request processes are grouped into a number of groups; and
transmission resources are allocated as re-transmission opportunities such that the automatic repeat request processes of the same group share transmission resource, and automatic repeat request processes that do not belong to the same group do not share transmission resource, wherein a first re-transmission opportunity precedes a second re-transmission opportunity, and the grouping of the at least two automatic repeat request processes lets the number of groups associated with the first re-transmission opportunity be larger than the number of groups associated with the second re-transmission opportunity.

29. The transceiver according to claim 28, wherein the packet is a Voice over Internet Protocol packet.

30. The transceiver according to claim 28, further adapted to comply with at least one of the standards Universal Mobile Telecommunications System including High Speed Packet Access and Universal Mobile Telecommunications System Long Term Evolution.

31. The transceiver according to claim 28, wherein the plurality of automatic repeat request processes comprise a plurality of hybrid automatic repeat request processes.

32. An electronic device comprising at least one transceiver according to claim 28.

33. The electronic device according to claim 32, wherein the electronic device is a portable or handheld mobile radio communication equipment, a mobile radio terminal, a mobile telephone, a pager, a communicator, an electronic organizer, a smartphone, a computer, an embedded drive, or a mobile gaming device.

* * * * *